(No Model.)
G. ERTEL.
THERMOSTATIC REGULATOR FOR INCUBATORS.
No. 518,522. Patented Apr. 17, 1894.
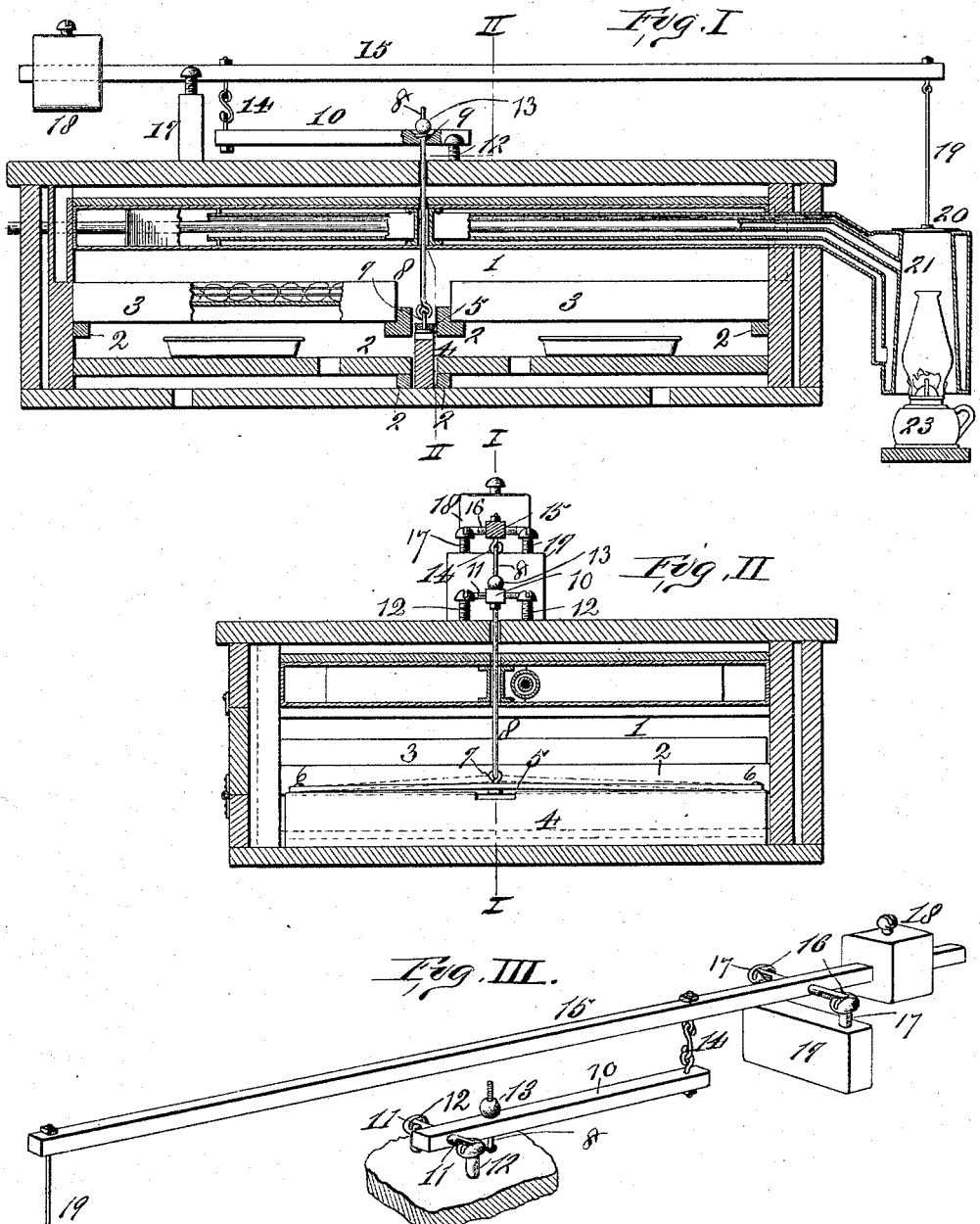

UNITED STATES PATENT OFFICE.

GEORGE ERTEL, OF QUINCY, ILLINOIS.

THERMOSTATIC REGULATOR FOR INCUBATORS.

SPECIFICATION forming part of Letters Patent No. 518,522, dated April 17, 1894.

Application filed September 15, 1893. Serial No. 485,573. (No model.)

*To all whom it may concern:*

Be it known that I, GEORGE ERTEL, of Quincy, in the county of Adams and State of Illinois, have invented a new and Improved Thermostatic Regulator for Incubators, of which the following is a full, clear, and exact description, reference being had to the accompanying drawings, forming part of this specification.

The invention relates to improvements in the class of thermostatic regulators, in which a hot air escape valve is controlled through the medium of a lever or lever mechanism, by a bar which is arranged in the egg chamber and adapted to expand or contract under varying degrees of heat.

The object of the present invention is to provide a new and improved thermostatic regulator for incubators, which permits the operator to readily and conveniently adjust the several parts so that they will operate automatically and at the same time prevent breakage on lowering the temperature in the egg chamber when changing from one hatch to another.

The invention consists of certain parts and details and combinations of the same, as will be fully described hereinafter, and then pointed out in the claim.

Figure I is a sectional side elevation of the improvement as applied, the section being taken on line I—I, Fig. II. Fig. II is a transverse section, taken on line II—II, Fig. I. Fig. III is a perspective view of the levers and their knife edge supports.

The incubator, of any approved construction, is provided with the usual egg chamber 1, containing transversely extending strips 2, fastened to the walls of the chamber and adapted to support the egg trays 3, in the usual manner. Between two such strips 2, is fitted a vertically movable strip 4, on top of which is placed a thermostatic bar 5, preferably made of rubber. The ends of this thermostatic bar are secured by screws, nails or other fastening devices 6 to the said strip 4, and in the middle of this bar 5 is fastened an eye 7, to receive a rod 8, extending upward and through the top of the egg chamber 1, as is plainly shown in Figs. I and II. The upper, threaded end of the rod 8 passes loosely through an eye 9, in a lever 10 having knife edge bearing 11 on supports 12. On the threaded end of the rod 8, screws a nut 13, adapted to engage the top of the lever 10, so as to permit the operator to regulate the position of the lever 10 according to the thermostatic bar 5. The free end of the lever 10 is connected by a small link 14, with a lever 15, having knife edge bearing 16 on supports 17, and carrying at its rear end an adjustable weight 18. The forward end of this lever 15 is connected by a rod 19 to a valve 20, forming a cover for the upper end of the heat flue 21 of the incubator. The valve 20 when opened permits the escape of the heat from the said flue to reduce the temperature within the egg chamber 1.

The operation is as follows:—The lamp 23 being lighted, heat radiates from the flue 21 into the hatching chamber. This heat causes the thermostatic bar 5 to buckle up, its ends being fastened to the strip 4, which carries the nut 13 away from the lever 10. When the heat in the hatching chamber has reached the proper temperature, say 103°, the weight 18 is moved so as to slightly overbalance the valve 20, and the nut 13 is screwed down until comes against the lever 10, and until it pulls the valve 20 down onto the top of the flue 21. The incubator is now left alone, the only attention required being to keep the lamp filled with oil. Should the heat exceed the proper temperature in the hatching chamber, the bar 5 will buckle up slightly more, raising the nut 13 from the lever 10, and permitting the weight 18 to open the valve 20, allowing heat to escape directly from the flue 21, without passing into the hatching chamber, and as the normal temperature of the chamber resumes the bar 5 closes the valve again, and this operation continues throughout the entire hatch. When the hatch is completed, the lamp is removed, or extinguished, and now the bar 5 will resume its flat position on the strip 4, as the hatching chamber cools off, and to avoid the stripping of the thread on the rod 8, or the breakage of some of the parts, due to the fact that the nut 13 is not turned back before the hatching chamber commences to cool off, and to accomplish this end the strip 4 is loosely held in its support so that it will yield upwardly to the strain caused by the contraction of the rubber bar. The discovery that by making the strip 4 so that it can move vertically, the parts will work perfectly, and at the same time danger of breakage is avoided, is of great practical advantage and utility in this class of thermostatic regulators for incubators. The regulator is also in position to properly regulate the heat in the egg chamber at the next hatch, any time thereafter, without having to re-set or change it in any of its bearings.

I claim as my invention—

In an incubator, a thermostatic regulator therefor, comprising a movable strip, an expansible thermostatic bar, secured at its ends to the said strip, and a valve operated by the thermostatic bar and adapted to control the temperature of the incubator; substantially as described.

GEORGE ERTEL.

In presence of—
L. E. EMMONS, Jr.,
L. E. EMMONS.